US012742046B2

(12) United States Patent
Chung

(10) Patent No.: US 12,742,046 B2
(45) Date of Patent: Sep. 22, 2026

(54) METHOD FOR MANUFACTURING POLYIMIDE FILM WITH REDUCED GLOSS

(71) Applicant: TAIMIDE TECHNOLOGY INCORPORATION, Hsinchu Hsien (TW)

(72) Inventor: Wen-Hsuan Chung, Hsinchu Hsien (TW)

(73) Assignee: TAIMIDE TECHNOLOGY INCORPORATION, Hsinchu Hsien (TW)

( * ) Notice: Subject to any disclaimer, the term of this patent is extended or adjusted under 35 U.S.C. 154(b) by 141 days.

(21) Appl. No.: 18/752,818

(22) Filed: Jun. 25, 2024

(65) Prior Publication Data

US 2025/0026899 A1 Jan. 23, 2025

(30) Foreign Application Priority Data

Jul. 20, 2023 (TW) ................................ 112127160

(51) Int. Cl.

| | |
|---|---|
| ***C08J 5/18*** | (2006.01) |
| ***B29C 41/00*** | (2006.01) |
| ***B29C 41/38*** | (2006.01) |
| ***B29C 41/42*** | (2006.01) |
| ***B29C 59/04*** | (2006.01) |
| ***B29C 71/02*** | (2006.01) |

(Continued)

(52) U.S. Cl.

CPC ............... *C08J 5/18* (2013.01); *B29C 41/003* (2013.01); *B29C 41/38* (2013.01); *B29C 41/42* (2013.01); *B29C 59/043* (2013.01); *B29C 71/02* (2013.01); *C08G 73/1028* (2013.01); *C08G 73/105* (2013.01); *B29K 2079/08* (2013.01); *B29K 2105/0014* (2013.01); *B29K 2905/00* (2013.01); *B29K 2995/0024* (2013.01); *B29K 2995/0077* (2013.01); *C08J 2379/08* (2013.01)

(58) Field of Classification Search

CPC ....... B29C 41/003; B29C 41/38; B29C 41/42; B29C 59/043; B29C 71/02; B29K 2079/08; B29K 2105/0014; B29K 2905/00; B29K 2995/0024; B29K 2995/0077

USPC ......................................................... 264/234

See application file for complete search history.

(56) References Cited

U.S. PATENT DOCUMENTS 3,600,361 A * 8/1971 Heacock et al. ......... B29D 7/00 528/502 C
2018/0105657 A1* 4/2018 Chung .................... B29C 35/02

(Continued)

FOREIGN PATENT DOCUMENTS

TW 201510000 A 3/2015

*Primary Examiner* — Christina A Johnson
*Assistant Examiner* — Xue H Liu

(57) ABSTRACT

The present invention provides a method for manufacturing a polyimide film with a reduced gloss, which comprises providing a diamine and a diacid anhydride for polymerization in a solvent to form a polyimide precursor solution; adding 2-5 equivalents of a dehydrating agent and a catalyst into the polyimide precursor solution and then coating a carrier with the polyimide precursor solution to form a polyimide gel film; providing an embossing wheel to roll the polyimide gel film peeled from the carrier at a temperature of 140-200° C and a pressure of 3-10 Kgf/cm$^2$ to form a concave and convex shape on a surface of the polyimide gel film; and baking the polyimide gel film to form a polyimide film with a 60° gloss of less than 100 GUs.

4 Claims, 1 Drawing Sheet

(51) Int. Cl.

| | |
|---|---|
| ***C08G 73/10*** | (2006.01) |
| *B29K 79/00* | (2006.01) |
| *B29K 105/00* | (2006.01) |

(56) References Cited

U.S. PATENT DOCUMENTS

| | | | | |
|---|---|---|---|---|
| 2018/0148339 | A1* | 5/2018 | Wu | C08G 73/1007 |
| 2019/0112425 | A1* | 4/2019 | Chung | C08K 5/3432 |

* cited by examiner

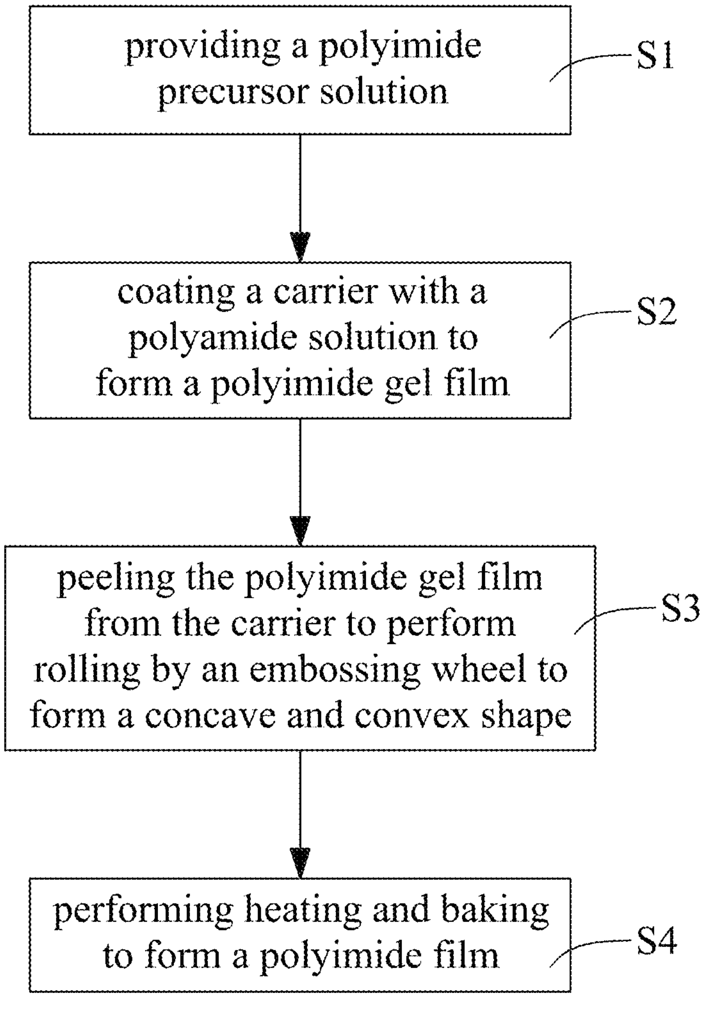
providing a polyimide precursor solution
S1
coating a carrier with a polyamide solution to form a polyimide gel film
S2
peeling the polyimide gel film from the carrier to perform rolling by an embossing wheel to form a concave and convex shape
S3
performing heating and baking to form a polyimide film
S4

METHOD FOR MANUFACTURING POLYIMIDE FILM WITH REDUCED GLOSS

CROSS-REFERENCE TO RELATED APPLICATION

This non-provisional application claims priority under 35 U.S.C. § 119(a) on Patent Application No(s). 112127160 filed in Taiwan, R.O.C. on Jul. 20, 2023, the entire contents of which are hereby incorporated by reference.

BACKGROUND OF THE INVENTION

1. Field of the Invention

The present disclosure relates to a method for manufacturing a polyimide film with a reduced gloss, and in particular to a method that forms a concave and convex surface on a polyimide gel film added with a dehydrating agent and a catalyst by rolling an embossing roller (also referred to as an embossing wheel), followed by heating and drying to produce a polyimide film with a reduced gloss.

2. Description of the Related Art

Flexible copper clad laminate (FCCL) is widely used in the electronics industry as a circuit substrate (PCB). In addition to the advantages of being light, thin and flexible, FCCL also uses polyimide (PI) film that has excellent electrical and thermal properties, as well as low dielectric constant (Dk) and high glass transition temperature (Tg), which results in quick transmission of electrical signals, thereby allowing components to be easily cooled down to operate well at higher temperatures.

However, polyimide films usually have high surface flatness, so that most of the incident light is reflected and has high gloss. In addition, for high-gloss polyimide films, a large amount of reflected light generated by irradiation on the surface may cause visual discomfort or easily cause eye fatigue when viewed for a long time. Moreover, low-gloss PI film is often used as the base material and coverlayer of flexible printed circuit boards, and is often used for alignment and calibration in the back-end of line. These flexible circuit boards are widely used in 3C products, optical lens modules, LCD modules, etc. Furthermore, the low-gloss characteristics can make the appearance of components more textured and beautiful.

A general method to reduce the gloss of a polyimide film is to add particles as a matting agent. In addition to the problem of increasing material costs, adding a large amount of matting agent will cause the polyimide film itself to be easily brittle.

In addition, some people have proposed to directly emboss the polyimide resin, but this method usually requires the use of cyclized polyimide resin to be shaped by thermo molding. For example, the patent application No. TW201510000A proposes to prepare a cyclized polyimide resin from alicyclic diamines and aromatic diacids, then make it into a film-shaped body at a temperature below 360° C, and then form a concave-convex surface by using the embossing processing.

BRIEF SUMMARY OF THE INVENTION

However, the inventors found that the mechanical properties and strength of the above-mentioned thermoplastic polyimide resin are usually low. After being processed into a film, they often cannot achieve good thermal properties and mechanical properties, and there are many inconveniences in use. In addition, after in-depth research, the inventors found that a polyimide film manufacturing method that directly forms a concave and convex surface on a polyimide gel film to form a polyimide film with reduced gloss can not only significantly reduce costs, but also maintain the mechanical strength of the polyimide film itself.

The present disclosure provides a method for manufacturing a polyimide film with a reduced gloss, which comprises providing a diamine and a diacid anhydride for polymerization in a solvent to form a polyimide precursor solution, wherein the diamine includes 10-45 mol % of 4,4'-diaminodiphenyl ether (4,4'-ODA) and 90-55 mol % of p-phenylenediamine (p-PDA) based on a total amount of the diamine, and the diacid anhydride includes 10-50 mol % of pyromellitic dianhydride (PMDA) and 90-50 mol % of 3,3',4,4'-biphenyltetracarboxylic dianhydride (BPDA) based on a total amount of the diacid anhydride; adding 2-5 equivalents of a dehydrating agent and a catalyst into the polyimide precursor solution and then coating a carrier with the polyimide precursor solution to form a polyimide gel film, which has a Young's modulus of 230-350 $Kgf/mm^2$; providing an embossing wheel to roll the polyimide gel film peeled from the carrier at a temperature of 140-200° C. and a pressure of 3-10 $Kgf/cm^2$ to form a concave and convex shape on a surface of the polyimide gel film; and baking the polyimide gel film to form a polyimide film with a 60° gloss of less than 100 GUs.

BRIEF DESCRIPTION OF THE DRAWINGS

FIG. 1 is a step diagram of a method for manufacturing a polyimide film with a reduced gloss according to the present disclosure.

DETAILED DESCRIPTION OF THE INVENTION

With reference to FIG. 1, which shows a method for manufacturing a polyimide film with a reduced gloss according to the present disclosure and includes the following steps.

A diamine and a diacid anhydride are provided for polymerization in a solvent to form a polyimide precursor solution (S1). Based on a total amount of the diamine, the diamine includes 10-45 mol % of 4,4'-diaminodiphenyl ether (4,4'-ODA) and 90-55 mol % of p-phenylenediamine (p-PDA). Based on a total amount of the diacid anhydride, the diacid anhydride includes 10-50 mol % of pyromellitic dianhydride (PMDA) and 90-50 mol % of 3,3',4,4'-biphenyltetracarboxylic dianhydride (BPDA).

A dehydrating agent and a catalyst are added into the polyimide precursor solution. There are 2-5 equivalents of the dehydrating agent. The polyimide precursor solution is coated on a carrier to form a gel film (S2), which has a Young's modulus of 230-350 $Kgf/mm^2$. A content of the solvent in the polyimide gel film is preferably 20-40 wt %.

Further, when the Young's modulus of the gel film is greater than 350 $kgf/mm^2$, the surface of the gel film is relatively rigid. Under the same conditions, the concave and convex shape of the embossing wheel surface is not easily transferred to the gel film, and it is necessary to increase the pressure or temperature for smooth transfer. However, if the pressure or temperature during transfer is increased, the gel film will easily wrinkle and reduce production efficiency.

On the other hand, when the Young's modulus of the gel film is less than 230 kgf/mm$^2$, the gel film is in a soft state. At this time, the support of the gel film itself is insufficient, and it is easy to stick to the embossing wheel and cause the film to rupture, resulting in the inability to produce.

After the gel film is peeled from the carrier, it is rolled through an embossing wheel with concave and convex shapes and totems at a temperature of 140-200° C and a pressure of 3~10 Kgf/cm$^2$ (S3), so that a surface of the gel film is formed into a concave and convex shape.

The gel film is baked to 350~500° C to form a polyimide film with a 60° gloss of less than 100 Gus (S4).

The solvent can be an aprotic polar solvent, such as dimethylacetamide (DMAC), N,N'-dimethylformamide (DMF), N-methylpyrrolidone (NMP), dimethyl sulfoxide (DMSO), etc. In the embodiments of the present disclosure, dimethylacetamide is used as a solvent.

The dehydrating agent can be an aliphatic acid anhydride (such as acetic anhydride and propionic anhydride), an aromatic acid anhydride (such as phenylic anhydride and phthalic anhydride), etc. In the embodiment of the present disclosure, acetic anhydride is used as the dehydrating agent.

The catalyst can be a heterocyclic tertiary amine (for example, picoline, pyridine, etc.), an aliphatic tertiary amine (for example, triethylamine (TEA), etc.), an aromatic tertiary amine (for example, dimethylaniline, etc.) etc. In the embodiment of the present disclosure, picoline is used as catalyst.

The following examples describe the present disclosure in detail.

Preparation of Polyimide Precursor Solution

The diamine monomer and the dianhydride monomer are polymerized in a solvent to form a polyimide precursor solution.

Preparation of Polyimide Precursor Solution A:

The diamine monomers, 4.82 g (0.0446 mol) of PDA and 0.99 g (0.0050 mol) of ODA, and the diacid anhydride monomers, 1.08 g (0.0050 mol) of PMDA and 13.11 g (0.0446 mol) of BPDA, are stirred and dissolved in 80.00 g of DMAc solvent to form a polyimide precursor solution A with a solid content of 20 wt %.

Preparation of Polyimide Precursor Solution B:

The diamine monomers, 2.93 g (0.0271 mol) of PDA and 4.44 g (0.0222 mol) of ODA, and the diacid anhydride monomers, 5.38 g (0.0246 mol) of PMDA and 7.25 g (0.0246 mol) of BPDA, are stirred and dissolved in 80.00 g of DMAc solvent to form a polyimide precursor solution B with a solid content of 20 wt %.

Example 1

25 g of DMAc solvent were added into 75 g of polyimide precursor solution A, which were then stirred and diluted to obtain a solid content of 15 wt %, followed by addition of 7.02 ml (2 equivalents) of acetic anhydride and 3.61 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 140° C, the pressure of the embossing roller was 3 Kgf/cm$^2$, and the speed of the embossing roller was 1 m/min. After being baked at 350° C for 1 hour, a polyimide film with a 60° gloss of 89 gloss units (GUs) was formed.

Example 2

25 g of DMAc solvent were added into 75 g of polyimide precursor solution A, which were then stirred and diluted to obtain a solid content of 15 wt %, followed by addition of 7.02 ml (2 equivalents) of acetic anhydride and 3.61 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 1 m/min. After being baked at 350° C for 1 hour, a polyimide film with a 60° gloss of 76 GUs was formed.

Example 3

25 g of DMAc solvent were added into 75 g of polyimide precursor solution B, which were then stirred and diluted to obtain a solid content of 15 wt %, followed by addition of 6.99 ml (2 equivalents) of acetic anhydride and 3.60 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 140° C, the pressure of the embossing roller was 3 Kgf/cm$^2$, and the speed of the embossing roller was 1 m/min. After being baked at 350° C for 1 hour, a polyimide film with a 60° gloss of 95 GUs was formed.

Example 4

25 g of DMAc solvent were added into 75 g of polyimide precursor solution B, which were then stirred and diluted to obtain a solid content of 15 wt %, followed by addition of 6.99 ml (2 equivalents) of acetic anhydride and 3.60 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 4 m/min. After being baked at 350° C for 1 hour, a polyimide film with a 60° gloss of 82 GUs was formed.

Example 5

25 g of DMAc solvent were added into 75 g of polyimide precursor solution A, which were then stirred and diluted to obtain a solid content of 15 wt %, followed by addition of 17.55 ml (5 equivalents) of acetic anhydride and 3.61 ml (1 equivalent) of methylpyridine to form a mixture. The mixture was coated on a carrier or steel belt, and then baked at 80° C for 15 minutes to form a polyimide gel film, which was peeled from the carrier or steel belt and then rolled by an embossing roller with a concave and convex surface. The temperature of the embossing roller was 140° C, the pressure of the embossing roller was 3 Kgf/cm$^2$, and the speed of the embossing roller was 4 m/min. After being baked at 350° C for 1 hour, a polyimide film with a 60° gloss of 65 GUs was formed.

Example 6

25 g of DMAc solvent were added into 75 g of polyimide precursor solution A, which were then stirred and diluted to obtain a solid content of 15 wt %, followed by addition of 17.55 ml (5 equivalents) of acetic anhydride and 3.61 ml (1 equivalent) of methylpyridine to form a mixture. The mixture was coated on a carrier or steel belt, and then baked at 80° C for 15 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 4 m/min. After being baked at 350° C for 1 hour, a polyimide film with a 60° gloss of 59 GUs was formed.

Example 7

25 g of DMAc solvent were added into 75 g of polyimide precursor solution B, which were then stirred and diluted to obtain a solid content of 15 wt %, followed by addition of 17.47 ml (5 equivalents) of acetic anhydride and 3.60 ml (1 equivalent) of methylpyridine to form a mixture. The mixture was coated on a carrier or steel belt, and then baked at 80° C for 15 minutes to form a polyimide gel film, which was peeled from the carrier or steel belt and then rolled by an embossing roller with a concave and convex surface. The temperature of the embossing roller was 140° C, the pressure of the embossing roller was 3 Kgf/cm$^2$, and the speed of the embossing roller was 4 m/min. After being baked at 350° C for 1 hour, a polyimide film with a 60° gloss of 72 GUs was formed.

Example 8

25 g of DMAc solvent were added into 75 g of polyimide precursor solution B, which were then stirred and diluted to obtain a solid content of 15 wt %, followed by addition of 17.47 ml (5 equivalents) of acetic anhydride and 3.60 ml (1 equivalent) of methylpyridine to form a mixture. The mixture was coated on a carrier or steel belt, and then baked at 80° C for 15 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 4 m/min. After being baked at 350° C for 1 hour, a polyimide film with a 60° gloss of 63 GUs was formed.

Comparative Example 1

25 g of DMAc solvent were added into 75 g of polyimide precursor solution A, which were then stirred and diluted to obtain a solid content of 15 wt %, followed by addition of 7.02 ml (2 equivalents) of acetic anhydride and 3.61 ml (1 equivalent) of methylpyridine to form a mixture. The mixture was coated on a carrier or steel belt, and then baked at 80° C for 20 minutes to form a polyimide gel film, which was then peeled from the carrier or steel belt. After being baked at 350° C for 1 hour, a polyimide film with a 60° gloss of 166 GUs was formed.

Comparative Example 2

25 g of DMAc solvent were added into 75 g of polyimide precursor solution A, which were then stirred and diluted to obtain a mixture having a solid content of 15 wt %. The mixture was coated on a carrier or steel belt, and then baked at 80° C for 30 minutes to form a polyimide gel film, which was then peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 1 m/min, but the film cannot be formed.

Comparative Example 3

25 g of DMAc solvent were added into 75 g of polyimide precursor solution A, which were then stirred and diluted to obtain a solid content of 15 wt %, followed by addition of 3.51 ml (1 equivalent) of acetic anhydride and 3.61 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 1 m/min, but the film cannot be formed.

Comparative Example 4

25 g of DMAc solvent were added into 75 g of polyimide precursor solution B, which were then stirred and diluted to obtain a mixture having a solid content of 15 wt %. The mixture was coated on a carrier or steel belt, and then baked at 80° C for 30 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 1 m/min, but the film cannot be formed.

Comparative Example 5

25 g of DMAc solvent were added into 75 g of polyimide precursor solution B, which were then stirred and diluted to obtain a solid content of 15 wt %, followed by addition of 3.49 ml (1 equivalent) of acetic anhydride and 3.61 ml (1 equivalent) of methylpyridine to form a mixture. The mixture was coated on a carrier or steel belt, and then baked at 80° C for 20 minutes to form a polyimide gel film, which was peeled from the carrier or steel belt and then rolled by an embossing roller with a concave and convex surface. The temperature of the embossing roller was 200° C, the pressure of the embossing roller was 10 Kgf/cm$^2$, and the speed of the embossing roller was 1 m/min, but the film cannot be formed.

As in the above-mentioned Examples and Comparative Examples, the present disclosure is preferably operated at a temperature of 140-200° C and a pressure of 3-8 Kgf/cm$^2$.

60° Gloss Value Test

In accordance with ASTM D523 specifications, a hand-held gloss meter (model: Micro Tri Gloss—BYK Gardner) was used for testing, and an average value of 3 independent measurement values was taken.

Young's Modulus Test of Gel Films

After the polyimide gel film was peeled from the carrier or steel belt, the solvent content was 30 wt %. According to the ASTM D882 specification, a universal tensile testing machine (model: Tinius Olsen 10ST) was used for testing, and an average value of 5 independent measurement values was taken.

TABLE 1

| | Acetic anhydride | Methyl-pyridine | Diamine ratio | | Diacid anhydride ratio | | Gel film Young's modulus | surface temperature of embossing wheel | pressure | 60° gloss value |
|---|---|---|---|---|---|---|---|---|---|---|
| Item | Eq. | Eq. | PDA | ODA | PMDA | BPDA | Kgf/mm$^2$ | ° C. | Kgf/cm$^2$ | GU |
| Example 1 | 2 | 1 | 90 | 10 | 10 | 90 | 312 | 140 | 3 | 89 |
| Example 2 | 2 | 1 | 90 | 10 | 10 | 90 | 312 | 200 | 10 | 76 |
| Example 3 | 2 | 1 | 55 | 45 | 50 | 50 | 235 | 140 | 3 | 95 |
| Example 4 | 2 | 1 | 55 | 45 | 50 | 50 | 235 | 200 | 10 | 82 |
| Example 5 | 5 | 1 | 90 | 10 | 10 | 90 | 347 | 140 | 3 | 65 |
| Example 6 | 5 | 1 | 90 | 10 | 10 | 90 | 347 | 200 | 10 | 59 |
| Example 7 | 5 | 1 | 55 | 45 | 50 | 50 | 258 | 140 | 3 | 72 |
| Example 8 | 5 | 1 | 55 | 45 | 50 | 50 | 258 | 200 | 10 | 63 |
| Comparative Example 1 | 2 | 1 | 90 | 10 | 10 | 90 | — | — | — | 166 |
| Comparative Example 2 | — | — | 90 | 10 | 10 | 90 | 185 | 200 | 10 | — |
| Comparative Example 3 | 1 | 1 | 90 | 10 | 10 | 90 | 205 | 200 | 10 | — |
| Comparative Example 4 | — | — | 55 | 45 | 50 | 50 | 178 | 200 | 10 | — |
| Comparative Example 5 | 1 | 1 | 55 | 45 | 50 | 50 | 214 | 200 | 10 | — |

Referring to the above Table 1, the differences between Comparative Examples and Examples are explained as follows.

First, the difference between Comparative Example 1 and Examples 1~2 and 5~6 lies in that Comparative Example 1 is not rolled after film formation. Further, as can be seen from Table 1, the 60° glosses of Examples 1~2 and 5~6 are all less than 100 Gus, but the 60° gloss of Comparative Example 1 is 166 GUs, which is not good.

Secondly, the difference between Comparative Example 2 and Examples 1~2 and 5~6 lies in that Comparative Example 2 is reacted under thermal closed loop conditions, no dehydrating agent and catalyst are added, and the Young's modulus of the gel film is less than 230 Kgf/mm$^2$, such that Comparative Example 2 does not form a film after rolling, so it is not good.

Furthermore, the difference between Comparative Example 3 and Examples 1~2 and 5~6 lies in that Comparative Example 3 reacts under conditions where the equivalent number of the dehydrating agent is insufficient, and the Young's modulus of the gel film is less than 230 Kgf/mm$^2$, such that Comparative Example 3 does not form a film after rolling, so it is not good.

Next, the difference between Comparative Example 4 and Examples 3~4 and 7~8 lies in that Comparative Example 4 is reacted under thermal closed loop conditions, no dehydrating agent and catalyst are added, and the Young's modulus of the gel film is less than 230 Kgf/mm$^2$, such that Comparative Example 4 does not form a film after rolling, so it is not good.

Finally, the difference between Comparative Example 5 and Examples 3~4 and 7~8 lies in that Comparative Example 5 reacts under conditions where the equivalent number of the dehydrating agent is insufficient, and the Young's modulus of the gel film is less than 230 Kgf/mm$^2$, such that Comparative Example 5 does not form a film after rolling, so it is not good.

The content of the above specific embodiments is to illustrate the present invention in detail. However, these embodiments are only for illustration and are not intended to limit the present invention. Those skilled in the art will understand that various changes or modifications made to the present invention without departing from the scope defined in the appended claims are part of the present invention.

While the present disclosure has been described by means of specific embodiments, numerous modifications and variations could be made thereto by those skilled in the art without departing from the scope and spirit of the present disclosure set forth in the claims.

What is claimed is:

1. A method for manufacturing a polyimide film with a reduced gloss, comprising:

providing a diamine and a diacid anhydride for polymerization in a solvent to form a polyimide precursor solution, wherein the diamine includes 10-45 mol % of 4,4'-diaminodiphenyl ether (4,4'-ODA) and 90-55 mol % of p-phenylenediamine (p-PDA) based on a total amount of the diamine, the diacid anhydride includes 10-50 mol % of pyromellitic dianhydride (PMDA) and 90-50 mol % of 3,3',4,4'-biphenyltetracarboxylic dianhydride (BPDA) based on a total amount of the diacid anhydride;

adding 2-5 equivalents of a dehydrating agent and a catalyst into the polyimide precursor solution and then coating a carrier with the polyimide precursor solution to form a polyimide gel film, which has a Young's modulus of 230-350 Kgf/mm$^2$, wherein the dehydrating agent is an aliphatic acid anhydride and/or an aromatic acid anhydride;

providing an embossing wheel to roll the polyimide gel film peeled from the carrier at a temperature of 140-200° C and a pressure of 3-10 Kgf/cm$^2$ to form a concave and convex shape on a surface of the polyimide gel film; and baking the polyimide gel film to form a polyimide film with a 60° gloss of less than 100 GUs.

2. The method of claim 1, wherein a content of the solvent in the polyimide gel film is between 20 wt % and 40 wt %.

3. The method of claim 1, wherein a roller speed of the embossing wheel is between 1 m/min and 4 m/min.

4. The method of claim 1, wherein the embossing wheel is operated at a temperature of 140-180° C and a pressure of 3-8 Kgf/cm$^2$.

* * * * *